United States Patent [19]
Reithel

[11] Patent Number: 5,775,080
[45] Date of Patent: Jul. 7, 1998

[54] RAKE FOR REMOVING WEEDS WITH INTACT ROOTS

[76] Inventor: Frederick C. Reithel, 623 Caledonia Rd., Dix Hills, N.Y. 11746

[21] Appl. No.: 726,627

[22] Filed: Oct. 7, 1996

[51] Int. Cl.$^6$ .................................................. A01D 7/06
[52] U.S. Cl. .................................. 56/400.07; 56/400.21
[58] Field of Search ........................... 56/400.21, 400.01, 56/400.05, 400.07

[56] References Cited

U.S. PATENT DOCUMENTS

| | | | |
|---|---|---|---|
| 1,509,369 | 9/1924 | McKesson | 56/400.07 |
| 2,780,976 | 2/1957 | Koering | 56/400.07 |
| 5,161,360 | 11/1992 | Hill | 56/400.21 X |
| 5,452,570 | 9/1995 | Schmid | 56/400.07 |
| 5,477,667 | 12/1995 | Bryant | 56/400.06 |

FOREIGN PATENT DOCUMENTS 11437 12/1895 Germany ........................ 56/400.01

Primary Examiner—Terry Lee Melius
Attorney, Agent, or Firm—Michael I. Kroll

[57] ABSTRACT

A rake (10) for removing weeds (12) with intact roots (14) from the soil (16) comprising an elongate handle (18). A spine (20) has a plurality of tines (22) extending therefrom. A structure (24) is provided for attaching the spine (20) traversely to the elongate handle (18). A crosspiece (26) is provided. A facility (28) is provided for affixing the crosspiece (26) across a rear surface (30) of the tines (22) at a predetermined distance "A" from distal free ends (32) of the tines (22). When the tines (22) enter the soil (16), the crosspiece (26) will engage with the roots (14) of the weeds (12) below grade level (34) to lift the weeds (12) with the intact roots (14) completely out of the soil (16).

2 Claims, 4 Drawing Sheets

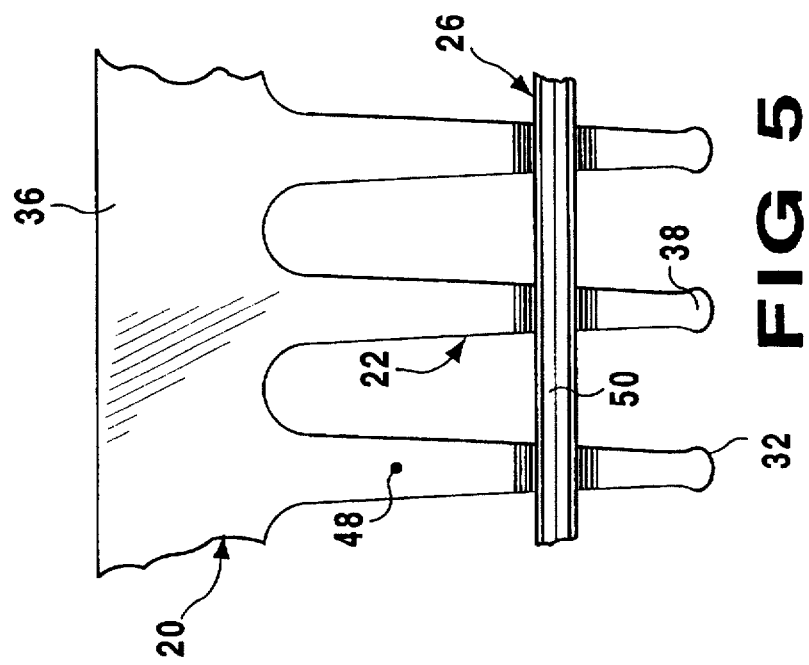
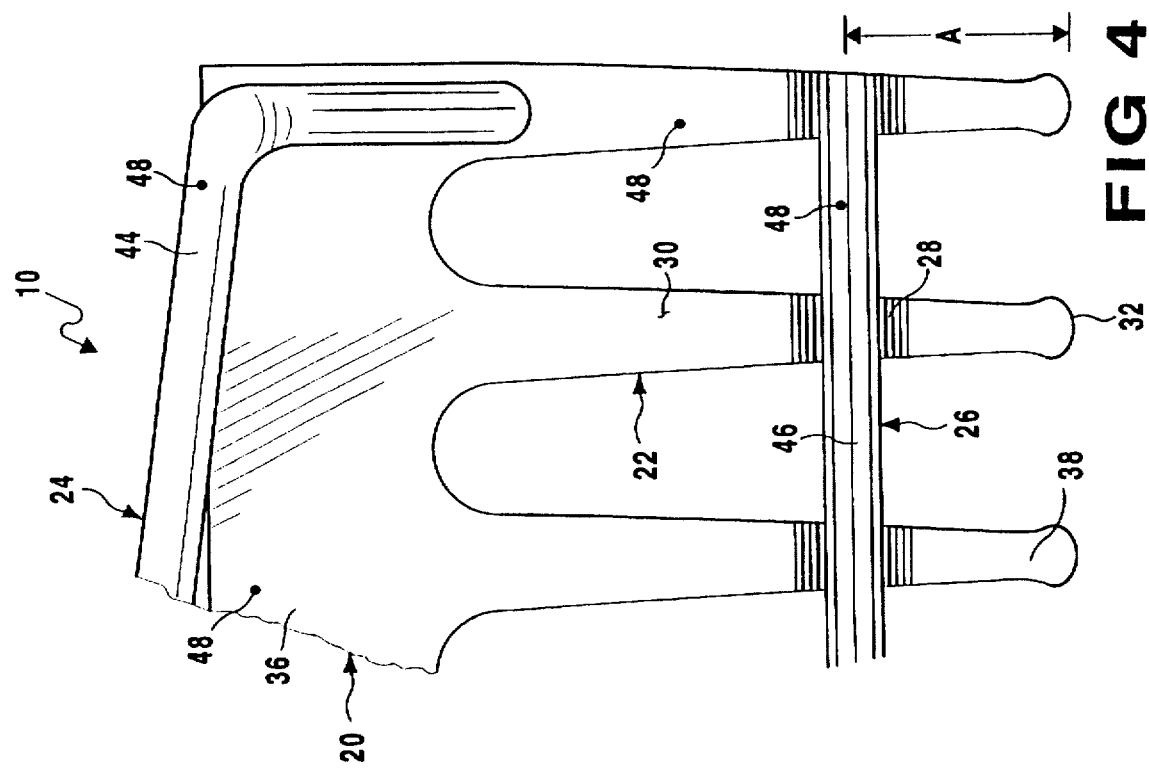

RAKE FOR REMOVING WEEDS WITH INTACT ROOTS

BACKGROUND OF THE INVENTION

1. Field of the Invention

The instant invention relates generally to rakes and more specifically it relates to a rake for removing weeds with intact roots.

2. Description of the Prior Art

Numerous rakes have been provided in prior art. For example, U.S. Pat. Nos. 180,217 to Ford; 1,050,721 to Dickson; 4,852,337 to Peterson; 5,452,570 to Schmid and 5,477,667 to Bryant all are illustrative of such prior art. While these units may be suitable for the particular purpose to which they address, they would not be as suitable for the purposes of the present invention as heretofore described.

FORD, DANIEL N.

IMPROVEMENT IN WEEDING IMPLEMENTS

U.S. Pat. No. 180,217

A weeder, substantially as described, consisting of a head, a rod and their connections, arranged and provided with a socket-piece or shank, all as explained.

DICKSON, JAMES

GARDEN RAKE

U.S. Pat. No. 1,050,721

A garden rake comprising a plurality of tines having bent tooth portions. The tines being normally flared. A suitable binding member is adapted for attachment to each of the tines, adjacent the end thereof, to bridge the space between the ends of the tines to shatter the earth through which the implement is provided drawn. A means is for removably securing the member upon the outer of the tines after the same have been contracted upon the intermediate tine, whereby a tension is maintained on the member.

PETERSON, THOMAS K.M.

METHOD AND APPARATUS FOR REMOVING AQUATIC PLANTS

U.S. Pat. No. 4,852,337

A method of and rake for removal of aquatic plants. The method has the steps of pulling a rake over an underwater bottom, engaging aquatic plants with flexible, resilient teeth and a flexible, resilient filament strung between the teeth, pulling the plant out of the bottom with the filament and distributing stress among the teeth through the filament when the rake snags an immovable obstruction. The rake has a crossbar, a plurality of elongate flexible and resilient teeth attached to the bar, and a flexible and resilient high tensile strength filament strung to and between all of the teeth. The filament pulls out plants and distributes stress among the teeth. An improved rake tooth has structure for holding a transverse filament adjacent a tip of the tooth.

SCHMID, ROY

ATTACHMENT FOR BOW RAKE AND COMBINATION OF ATTACHMENT AND RAKE

U.S. Pat. No. 5,452,570

An attachment is usable in combination with a standard unmodified bow rake having a tined member with a plurality of equally spaced like tines including first and second end tines, the tines being of predetermined length with aligned free ends. The attachment includes a plate mountable behind the tined member and having a straight bottom edge. The plate is adjustably positionable with the bottom edge in any of a plurality of positions to expose different effective lengths of the tines to control the depth of penetration of the tines into the ground, from zero to near the full actual length of the tines.

BRYANT, LOUIS L.

GARDENING IMPLEMENT

U.S. Pat. No. 5,477,667

A gardening implement is disclosed having a handle, a base attached to the handle, and a series of tines extending from the base. Between the distal ends of the tines and the base, perpendicular to the tines, and extending between them, is a rod or member that serves to aid in catching the uprooted plants. In addition, a U-shaped member is attached to the base extending opposite and away from the tines' distal ends.

SUMMARY OF THE INVENTION

A primary object of the present invention is to provide a rake for removing weeds with intact roots that will overcome the shortcomings of the prior art devices which do not adequately remove the intact roots with the weeds.

Another object is to provide a rake for removing weeds with intact roots having end flattened tapered chisel pointed tines in conjunction with approximate thirty degree positive tine angles, to permit easy penetration into the soil with minimum effort.

An additional object is to provide a rake for removing weeds with intact roots having a cross rod attached transversely to the tines approximately three quarters of an inch away from the tine tips, so that the cross rod will engage with the weed roots, to lift the weeds with the intact roots completely out of the soil.

A further object is to provide a rake for removing weeds with intact roots that is simple and easy to use.

A still further object is to provide a rake for removing weeds with intact roots that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 4 is a further enlarged view of the area indicate by arrow 4 in FIG. 2.

FIG. 5 is a front view of a portion of an alternate configuration, showing the crosspiece being web sections integrally formed between the tines.

Similar reference characters denote corresponding features consistently throughout the attached drawings.

DETAILED DESCRIPTION OF THE PREFERRED EMBODIMENTS

Figure 1:
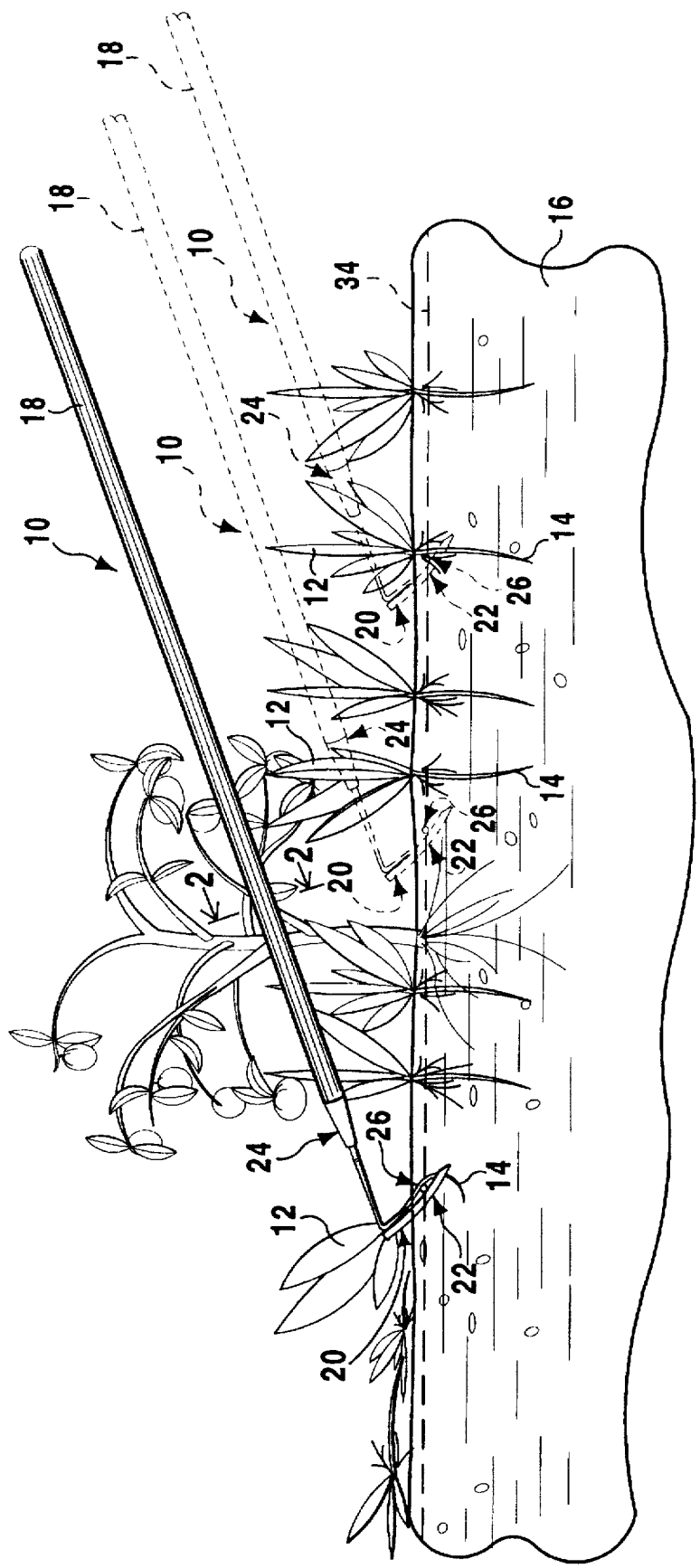
FIG. 1 is a side view showing the instant invention in use.
Figure 2:
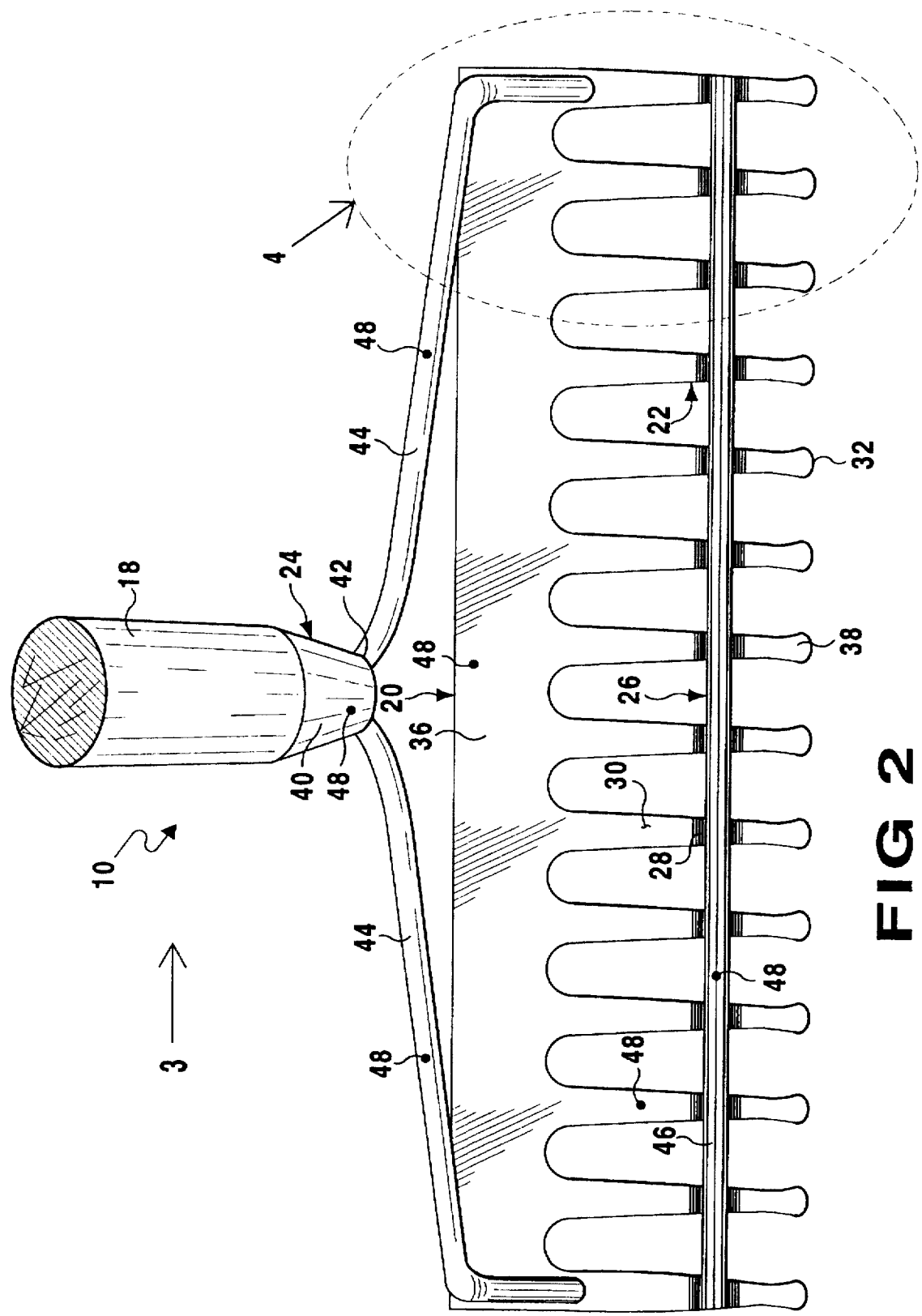
FIG. 2 is an enlarged cross sectional view taken along line 2—2 in FIG. 1.
Figure 3:
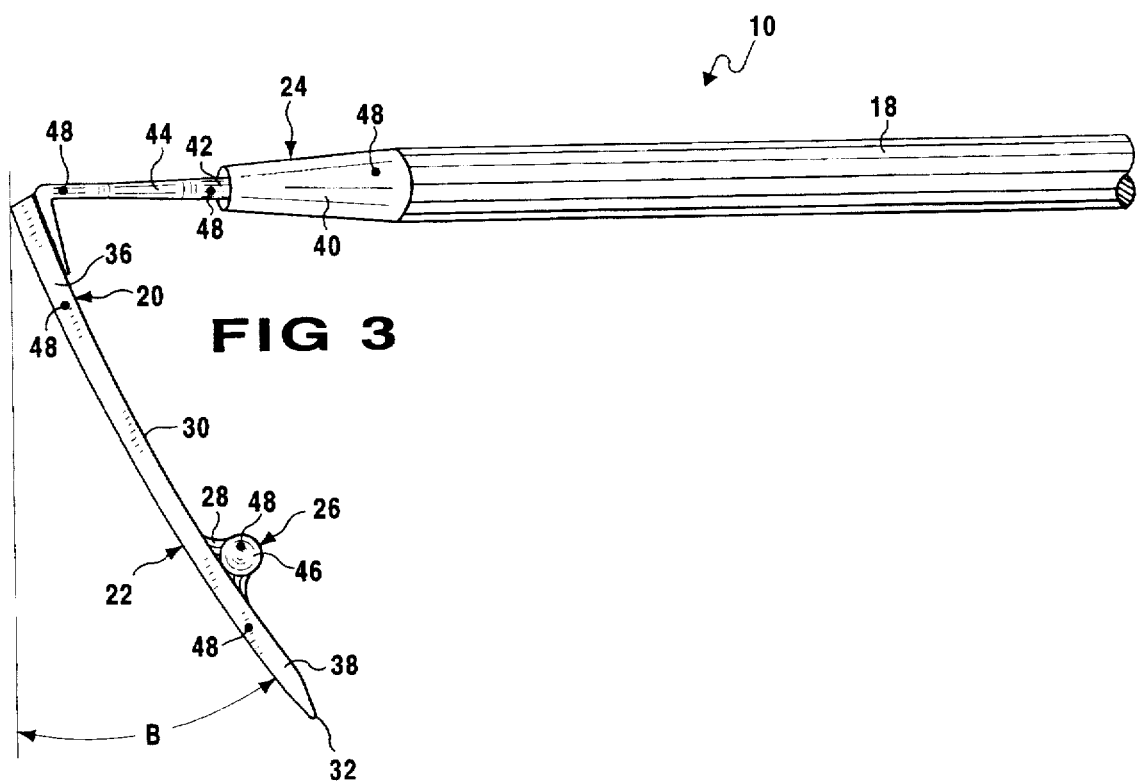
FIG. 3 is an enlarged side view taken in the direction of arrow 3 in FIG. 2.

Turning now descriptively to the drawings, in which similar reference characters denote similar elements throughout the several views, FIGS. 1 through 4 illustrate a rake 10 for removing weeds 12 with intact roots 14 from the soil 16, comprising an elongate handle 18. A spine 20 has a plurality of tines 22 extending therefrom. A structure 24 is for attaching the spine 20 traversely to the elongate handle 18. A crosspiece 26 is provided. A facility 28 is for affixing the crosspiece 26 across a rear surface 30 of the tines 22 at a predetermined distance indicated by letter "A" in FIG. 4, from distal free ends 32 of the tines 22. When the tines 22 enter the soil 16, the crosspiece 26 will engage with the roots 14 of the weeds 12 below grade level 34 to lift the weeds 12 with the intact roots 14 completely out of the soil 16.

The spine 20 is a generally rigid rectangular member 36, with the tines 22 being integral with the spine 20. The distal free end 32 of each tine 22 includes a flattened tapered chisel pointed tip 38. Each tine 22 extends from the spine 20 approximately at a thirty degree positive angle from the horizontal, indicated by the letter "B" in FIG. 3, to permit easy penetration into the soil 16 with minimum effort.

The spine attaching structure 24 consists of a ferrule 40 secured to a bottom end of the elongate handle 18. A tang 42 projects out from the ferrule 40. A pair of bow arms 44 are provided. Each bow arm 44 extends from an opposite end of the spine 20 to the tang 42. The crosspiece 26 is a cylindrical rod 46, extending completely across all of the tines 22, approximately three quarters of an inch away from the distal free ends of the tines 22.

The crosspiece affixing facility 28 can be a spot weld formed between the crosspiece 26 and the tines 22. The crosspiece affixing facility 28 can be a weld formed between crosspiece 26 and the tines 22. The crosspiece affixing facility 28 can be a braze formed between the crosspiece 26 and the tines 22. The crosspiece affixing facility 28 can be a solder formed between the crosspiece 26 and the tines 22.

The spine 20 with the tines 22 and the crosspiece 26 are fabricated out of a strong durable metal material 48. The ferrule 40, the tang 42 and the bow arms 44 are also fabricated out of the strong durable metal material 48.

In addition to removing weeds intact, the crosspiece 26 has a lump breaking capability and grinding effect to leave the soil 16 smooth. FIG. 5 shows an alternate configuration whereby when blanking, stamping or forging out the tines 22, the crosspiece 26 can be formed by leaving web sections 50 between the tines as integral pieces.

OPERATION OF THE INVENTION
To use the rake 10, the following steps should be taken:

1. Grasp the elongate handle 10.
2. Drive the tines 22 into the soil 16.
3. Make sure that the crosspiece 26 is below grade level at 34 in the soil 16.
4. Pull the elongate handle 18 with a slight downward pressure, so that the crosspiece 26 engages with the roots 14 of the weeds 12.
5. Continue to pull the elongate handle 18 laterally, until the crosspiece 26 and the tines 22 extract the intact roots 14 on the weeds 12 completely out of the soil 16.

LIST OF REFERENCE NUMBERS

A predetermined distance of 26
B angle of 22
10 rake
12 weed
14 intact root of 12
16 soil
18 elongate handle of 10
20 spine of 10
22 tine on 20
24 spine attaching structure of 10
26 crosspiece of 10
28 crosspiece affixing facility of 10
30 rear surface of 22
32 distal free end of 22
34 below grade level in 16
36 generally rigid rectangular member for 20
38 flattened tapered chisel pointed tip for 32
40 ferrule of 24
42 tang of 24
44 bow arm of 24
46 cylindrical rod for 26
48 strong durable metal material for 20, 22, 26, 40, 42 and 44
50 web section of 26

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A rake for removing weeds with intact roots from the soil comprising:
   a) an elongate handle;
   b) a generally rigid rectangular spine having a plurality of tines extending therefrom and integral with said spine, the distal end of each tine having an enlarged, rounded tip, said tip having a flattened tapered chisel edge;
   c) means for attaching said spine transversely to said elongate handle comprising a ferrule secured to a bottom end of said elongate handle, a tang projecting out from said ferrule, and a pair of bow arms in which each said bow arm extends from an opposite end of said spine to said tang, said spine being attached to said handle so that said tines are approximately at a 30 degree angle from the horizontal when said rake is being used, to permit easy penetration into the soil with minimum effort;

d) a crosspiece made from a cylindrical rod; and e) means for affixing by welding said crosspiece across a surface of said tines facing said handle at a predetermined distance from distal free ends of said tines, so that when said tines enter the soil, said crosspiece will engage with the roots of the weeds below grade level to lift the weeds with the intact roots completely out of the soil.

2. A rake as recited in claim 1, wherein said crosspiece extends completely across all of said tines approximately three quarters of an inch away from the distal free ends of said tines.

* * * * *